United States Patent
Guo et al.

(10) Patent No.: US 7,115,682 B2
(45) Date of Patent: Oct. 3, 2006

(54) REMOVABLE, WATER-WHITENING RESISTANT PRESSURE SENSITIVE ADHESIVES

(75) Inventors: Jong-Shing Guo, Longmeadow, MA (US); Augustin T. Chen, Cheshire, CT (US); Sharon D. Trembley, Chicopee, MA (US)

(73) Assignee: Cytec Surface Specialties, Inc., Wilmington, DE (US)

( * ) Notice: Subject to any disclaimer, the term of this patent is extended or adjusted under 35 U.S.C. 154(b) by 164 days.

(21) Appl. No.: 10/670,926

(22) Filed: Sep. 25, 2003

(65) Prior Publication Data

US 2004/0143058 A1    Jul. 22, 2004

Related U.S. Application Data

(60) Provisional application No. 60/413,786, filed on Sep. 26, 2002.

(51) Int. Cl.
*C08K 5/24* (2006.01)
(52) U.S. Cl. ............... 524/556; 524/560; 524/561; 524/745; 524/747; 524/831; 525/376
(58) Field of Classification Search ............ 524/560, 524/556, 561, 745, 747, 831, 833, 592, 593; 525/376
See application file for complete search history.

(56) References Cited

U.S. PATENT DOCUMENTS

| 5,663,241 | A | * | 9/1997 | Takamatsu et al. ...... 525/328.6 |
| 5,928,783 | A | * | 7/1999 | Phan et al. ............ 428/355 EN |
| 5,969,032 | A | * | 10/1999 | Phan et al. .................. 524/460 |
| 6,242,515 | B1 | * | 6/2001 | Zhao et al. .................. 524/190 |
| 6,444,749 | B1 | * | 9/2002 | Mestach ..................... 524/827 |

* cited by examiner

*Primary Examiner*—David W. Wu
*Assistant Examiner*—Satya B. Sastri
(74) *Attorney, Agent, or Firm*—Lathrop & Gage, L.C.

(57) ABSTRACT

Removable pressure sensitive adhesive compositions having enhanced resistance to water-whitening comprising a crosslinked aqueous emulsion polymer are disclosed. The crosslinked aqueous emulsion polymer comprises (a) at least one hydrophobic monomer; (b) greater than 1 wt. % of at least one hydrophilic monomer; (c) greater than 3 wt. % of at least one mono-olefinically unsaturated monomer having an aldehyde or ketone group; (d) optionally at least one partially hydrophilic monomer; and (e) an effective amount of at least one water-soluble or water-dispersible polymerizable surfactant; wherein the crosslinked aqueous emulsion polymer is crosslinked with an effective amount of at least one polyhydrazide crosslinker, the wt. % of monomers (a), (b), (c) and (d) are based on the total weight of monomers (a), (b), (c) and (d), and the mean particle size of the crosslinked aqueous emulsion polymer is less than about 400 nm.

32 Claims, No Drawings

REMOVABLE, WATER-WHITENING RESISTANT PRESSURE SENSITIVE ADHESIVES

RELATED APPLICATIONS

The present application is a nonprovisional application claiming benefit of U.S. patent application Ser. No. 60/413,786, filed 26 Sep. 2002, entitled Removable Water-Whitening Resistant Pressure Sensitive Adhesives, the disclosures of which are hereby incorporated herein by reference.

BACKGROUND OF THE INVENTION

This invention relates to removable pressure sensitive adhesives based on aqueous emulsions. The removable pressure sensitive adhesives of the invention have enhanced resistance to water-whitening.

Removable pressure sensitive adhesives are used on a variety of products including labels, tapes, films, and the like, to enable the product to adhere to a substrate and then to later be removed from the substrate without difficulty and without leaving a stain or residue. To be suitable for such applications, the pressure sensitive adhesive must have good adhesion with low peel strength and must not exhibit a significant increase in adhesion over time. Optimally, the pressure sensitive adhesive should exhibit such physical properties on a variety of substrates. Typical commercially available aqueous acrylic emulsion pressure sensitive adhesives that are removable cannot be used with film facestocks which are used in outdoor applications. One outdoor application involves decorative decals which are applied to substrates such as glass. One technique for applying such a decorative decal to a substrate is to spray water on the adhesive and/or substrate so that the decal is slidingly movable over the substrate for ease of positioning. Unfortunately, in such a technique, the aqueous acrylic emulsion adhesive film turns milky in contact with water. Another outdoor application involves protective films that are applied via adhesive to materials for construction projects where the film serves to protect the construction material until the construction project is completed. Exposure of the protective film covered construction materials to water or high humidity in outdoor environments often results in the aqueous acrylic emulsion adhesive turning milky. For transparent filmstocks, this water-whitening results in an unsatisfactory appearance.

For a successful aqueous acrylic emulsion removable pressure sensitive adhesive to be used with decorative or protective films and decals in outdoor applications, the adhesive needs to exhibit good water resistance along with good anchorage of the adhesive to the film facestock to assure clean removability from the substrate. The current commercially available aqueous acrylic emulsion pressure sensitive adhesives which demonstrate good water-whitening resistance are permanent adhesives, i.e. those that leave an adhesive residue on the substrate if the facestock is removed. Currently available removable aqueous acrylic emulsion pressure sensitive adhesives which demonstrate good anchorage to the film also exhibit poor water-whitening resistance. Accordingly, there is a need for an aqueous acrylic emulsion pressure sensitive adhesive which exhibits both desired properties of removability and water-whitening resistance.

SUMMARY OF THE INVENTION

According to the invention, a removable, water-whitening resistant pressure sensitive adhesive (PSA) is provided comprising a crosslinked aqueous emulsion polymer comprising (a) at least one hydrophobic monomer selected from an alkyl(meth)acrylate ester of an alcohol wherein the alkyl portion of the alcohol is linear or branched and contains at least 4 carbon atoms, or a mixture of at least one styrenic monomer and at least one alkyl(meth)acrylate ester of an alcohol wherein the alkyl portion of the alcohol is linear or branched and contains at least 4 carbon atoms, wherein when a styrenic monomer is present, the styrenic monomer is present in an amount up to about 30 wt. % of the total hydrophobic monomer mixture; (b) greater than 1 wt. % of at least one hydrophilic monomer; (c) greater than 3 wt. % of at least one mono-olefinically unsaturated monomer having an aldehyde or ketone group; (d) optionally at least one partially hydrophilic monomer selected from alkyl(meth)acrylate esters of an alcohol wherein the alkyl portion of the alcohol has 1 to 2 carbon atoms, N-vinyl-2-pyrrolidone, or mixtures thereof; and (e) an effective amount of at least one water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof; wherein the crosslinked aqueous emulsion polymer is crosslinked with an effective amount of at least one polyhydrazide crosslinker, the wt. % of monomers (a), (b), (c) and (d) are based on the total weight of monomers (a), (b), (c) and (d), and the mean particle size of the crosslinked aqueous emulsion polymer is less than about 400 nm.

BRIEF DESCRIPTION OF THE DRAWINGS

Not applicable.

DETAILED DESCRIPTION OF THE INVENTION

This invention provides aqueous emulsion pressure sensitive adhesives useful with decorative or protective films and decals in outdoor applications, the adhesive exhibiting removability from the substrate and good water resistance when subject to water or high humidity during use. The pressure sensitive adhesives of the invention have good adhesion with low peel strength. The face stock material having coated thereon the removable, water-whitening resistant pressure sensitive adhesive composition of the invention exhibit low peel adhesion with failure mode being essentially adhesive failure. The peel adhesion is dependent on the aqueous adhesive composition of the invention and the substrate. For example, the PSA compositions of the invention typically exhibit dry film peel values less than about 2.5 pounds per inch (431 N/m) peel force, preferably about 0.1 to about 2 pounds per inch (about 17.2 to about 345 N/m) peel force, with adhesive failure mode.

The removable pressure sensitive adhesives of the invention exhibit enhanced resistance to water-whitening. The extent of water-whitening can be determined visually by soaking the adhesive film in room temperature water for 24 hours and visually ranking the whitening of the adhesive.

The invention relates to a removable, water-whitening resistant pressure sensitive adhesive (PSA) is provided comprising a crosslinked aqueous emulsion polymer comprising (a) at least one hydrophobic monomer selected from an alkyl(meth)acrylate ester of an alcohol wherein the alkyl portion of the alcohol is linear or branched and contains at least 4 carbon atoms, or a mixture of at least one styrenic monomer and at least one alkyl(meth)acrylate ester of an alcohol wherein the alkyl portion of the alcohol is linear or branched and contains at least 4 carbon atoms, wherein when a styrenic monomer is present, the styrenic monomer is present in an amount up to about 30 wt. % of the total hydrophobic monomer mixture; (b) greater than 1 wt. % of at least one hydrophilic monomer; (c) greater than 3 wt. % of at least one mono-olefinically unsaturated monomer having an aldehyde or ketone group; (d) optionally at least one partially hydrophilic monomer selected from alkyl (meth) acrylate esters of an alcohol wherein the alkyl portion of the alcohol has 1 to 2 carbon atoms, N-vinyl-2-pyrrolidone, or mixtures thererof; and (e) an effective amount of at least one water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof; wherein the crosslinked aqueous emulsion polymer is crosslinked with an effective amount of at least one polyhydrazide crosslinker, the wt. % of monomers (a), (b), (c) and (d) are based on the total weight of monomers (a), (b), (c) and (d), and the mean particle size of the crosslinked aqueous emulsion polymer is less than about 400 nm.

Hydrophobic monomers that can be employed according to the invention include at least one alkyl(meth)acrylate ester of an alcohol wherein the alkyl portion of the alcohol is linear or branched and contains at least 4 carbon atoms, and mixtures of at least one styrenic monomer and at least one alkyl(meth)acrylate ester of an alcohol wherein the alkyl portion of the alcohol is linear or branched and contains at least 4 carbon atoms. As used herein, the term alkyl(meth) acrylate includes both alkyl acrylates and alkyl methacrylates. The alkyl groups of the alkyl acrylate or alkyl methacrylate monomers are preferably linear or branched alkyl radicals having from 4 to about 14 carbon atoms, more preferably from 4 to about 10 carbon atoms, and most preferably from 4 to about 8 carbon atoms. Examples of suitable alkyl acrylates and alkyl methacrylates include, but are not limited to, isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures of two or more. Examples of suitable styrenic monomers include, but are not limited to, styrene, α-methyl styrene, vinyl toluene, t-butyl styrene, dimethyl styrene, and the like, singly or in mixtures of two or more.

The currently preferred alkyl acrylate or alkyl methacrylate ester monomers are 2-ethylhexyl acrylate, n-butyl acrylate, and mixtures thereof. The currently preferred styrenic monomer is styrene.

The amount of hydrophobic monomers based on the total weight of monomers (a), (b), (c), and (d) is preferably about 50 to about 95 wt. %, more preferably about 70 to about 90 wt. %, and most preferably about 75 to about 90 wt. %.

When a styrenic monomer is employed in the invention, the amount of styrenic monomer can conveniently be expressed as a wt. % of the total hydrophobic monomer mixture. When a styrenic monomer is employed, the amount of styrenic monomer is up to about 30 wt. %, preferably about 5 to about 30 wt. %, and more preferably about 10 to about 20 wt. %, of the total hydrophobic monomer mixture.

Hydrophilic monomers that can be employed according to the invention are monomers that are copolymerizable with the hydrophobic monomer and that are water soluble. The hydrophilic monomers are selected from monoolefinic monocarboxylic acids, monoolefinic dicarboxylic acids, 2-hydroxyethyl acrylate, or mixtures thereof.

Examples of suitable hydrophilic monomers include, but are not limited to, acrylic acid, methacrylic acid, fumaric acid, maleic acid, itaconic acid, crotonic acid, oligomeric acrylic acid, 2-hydroxyethyl acrylate, and mixtures thereof. The currently preferred hydrophilic monomers are acrylic acid, 2-hydroxyethyl acrylate, methacrylic acid, and mixtures thereof.

The amount of hydrophilic monomers based on the total weight of monomers (a), (b), (c), and (d) is greater than 1 wt. %, preferably about 2 to about 10 wt. %, more preferably about 3 to about 10 wt. %, and most preferably about 3 to about 8 wt. %.

Mono-olefinically unsaturated monomers having an aldehyde or ketone group that can be employed according to the invention are monomers containing one or more aldo or keto groups and a polymerizable carbon-carbon double bond.

Examples of suitable mono-olefinically unsaturated monomers having an aldehyde or ketone group include, but are not limited to, acrolein, methacrolein, vinylbenzaldehyde, crotonaldehyde, (meth)acryloxyalkylpropanals of the general formula where

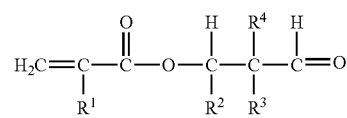

$R^1$ is —H or —$CH_3$, $R^2$ is —H or alkyl of 1 to 3 carbon atoms, $R^3$ is alkyl of 1 to 3 carbon atoms, and $R^4$ is alkyl of 1 to 4 carbon atoms, vinyl acetoacetate, allyl acetoacetate, vinyl methyl ketone, vinylbenzene methyl ketone, acetoacetoxyethyl methacrylate, vinyl ethyl ketone, vinyl isobutyl ketone, vinyl butyl ketone, diacetone(meth)acrylamide, diacetone(meth)acrylate, acetonyl acrylate, 2-hydroxypropyl acrylate-acetyl acetate, 1,4-butanediol acrylate-acetyl acetate.

The above (meth)acryloxyalkylpropanals can be prepared by the process described in British Pat. No. 1,601,077, by esterifying a β-hydroxyalklpropanal of the general formula

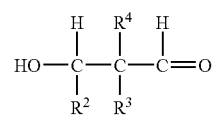

where $R^1$, $R^2$, $R^3$, and $R^4$ are as defined above, in the presence of an inert diluent and small amounts of sulfonic acids and mineral acids, at from 40 to 120° C., in particular from 60 to 90° C.

The currently preferred mono-olefinically unsaturated monomers having an aldehyde or ketone group are diacetone acrylamide, diacetone acrylate, acrolein, or mixtures thereof.

The amount of mono-olefinically unsaturated monomers having an aldehyde or ketone group based on the total weight of monomers (a), (b), (c), and (d) is greater than 3 wt.

% to about 20 wt. %, preferably about 3.5 to about 20 wt. %, and more preferably about 4 to about 10 wt. %.

Partially hydrophilic monomers that can be employed according to the invention include alkyl(meth)acrylate esters of an alcohol wherein the alkyl portion of the alcohol has 1 to 2 carbon atoms, N-vinyl-2-pyrrolidone, or mixtures thereof. The partially hydrophilic monomers can also be referred to as partially water soluble monomers.

Examples of suitable partially hydrophilic monomers include methyl acrylate, methyl methacrylate, ethyl acrylate, N-vinyl-2-pyrrolidone, and mixtures thereof. The currently preferred partially hydrophilic monomers are methyl acrylate, methyl methacrylate, and mixtures thereof, with methyl acrylate being currently most preferred.

The partially hydrophilic monomers are optionally present in the aqueous emulsion polymer of the invention. The amount of partially hydrophilic monomers based on the total weight of monomers (a), (b), (c), and (d) is 0 to about 45 wt. %, preferably about 5 to about 25 wt. %, and more preferably about 5 to about 15 wt. %.

Water-soluble or water-dispersible polymerizable surfactants having a terminal allyl amine moiety that can be employed according to the invention include those polymerizable surfactants disclosed in U.S. Pat. No. 5,928,783 and U.S. Pat. No. 6,239,240, which are incorporated herein by reference in their entirety. Preferably, the polymerizable surfactants of the invention contain a hydrophilic portion selected from a sulfonate allyl amine moiety, a sulfate allyl amine moiety, or a phosphate allyl amine moiety, and a hydrophobic portion selected from—R, or a group having the formula RO—(CH$_2$CH$_2$O)$_n$—; wherein R is an alkyl group or an alkyl-substituted phenyl group wherein the alkyl group has 1 to 20 carbon atoms, preferably 10 to 18 carbon atoms, and n is an integer from 2 to 100, preferably 2 to 15. The hydrophilic portion and the hydrophobic portion are connected by means of a covalent bond. Combinations of such polymerizable surfactants can be used in preparing the polymers of the invention. The water-soluble or water-dispersible polymerizable surfactants having a terminal allyl amine moiety useful in the invention are available from Stepan Company under the Polystep® NMS trademark.

Suitable water-soluble or water-dispersible polymerizable surfactants having a terminal allyl amine moiety include, but are not limited to, the following examples.

A preferred polymerizable surfactant is an allyl amine salt of an alkyl benzene sulfonate having the formula

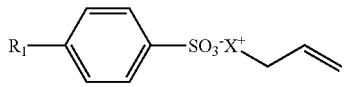

wherein $R_1$ is an alkyl group having 1 to 20 carbon atoms, preferably 10 to 18 carbon atoms, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of dodecylbenzene sulfonate.

Another preferred polymerizable surfactant is an allyl amine salt of an alkyl ether sulfate having the formula

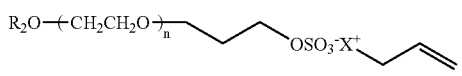

wherein $R_2$ is an alkyl group having 1 to 20 carbon atoms, preferably 10 to 18 carbon atoms, n is an integer from 2 to 100, preferably 2 to 15, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of laureth sulfate.

Another preferred polymerizable surfactant is an allyl amine salt of a phosphate ester having the formula

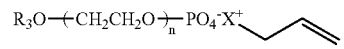

wherein $R_3$ is an alkyl or alkyl-substituted phenyl group wherein the alkyl group has 1 to 20 carbon atoms, n is an integer from 2 to 100, preferably 2 to 15, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of nonylphenol ethoxylate (9 moles EO) phosphate ester.

Yet another preferred polymerizable surfactant is an allyl amine salt of a sulfate having the formula

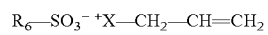

wherein $R_6$ is an alkyl group having 6 to 20 carbon atoms, preferably 10 to 18 carbon atoms, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$.

The substituted phenyl compounds having at least one alkenyl substituent that can be employed as water-soluble or water dispersible polymerizable surfactants according to the invention include those disclosed in U.S. Pat. No. 5,332,854, which is incorporated herein by reference in its entirety.

Suitable substituted phenyl compounds having at least one alkenyl substituent include compounds having the formula:

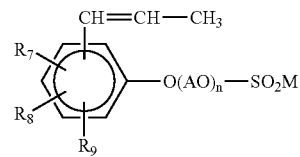

wherein $R_7$ is an alkyl, alkenyl or aralkyl group containing 6 to 18 carbon atoms; $R_8$ is a hydrogen atom or an alkyl, alkenyl or aralkyl group containing 6 to 18 carbon atoms; $R_9$ is a hydrogen atom or a propenyl group; A is an unsubstituted or substituted alkylene group of 2 to 4 carbon atoms; n is an integer of 1 to about 200, preferably 2 to about 100; and M is an alkali metal, an ammonium ion or an alkanolamine residue.

In the substituted phenyl compounds of the invention, the alkyl, alkenyl and aralkyl groups of $R_7$ and $R_8$ are independently selected and may be the same or different. Suitable alkyl groups include, but are not limited to, hexyl, heptyl, octyl, nonyl, decyl, undecyl, dodecyl, tridecyl, tetradecyl, pentadecyl, hexadecyl, heptadecyl and octadecyl. Suitable alkenyl groups include, but are not limited to, hexenyl, heptenyl, octenyl, nonenyl, decenyl, undecenyl, dodecenyl, tridecenyl, tetradecenyl, pentadecenyl, hexadecenyl, heptadecenyl and octadecenyl. Suitable aralkyl groups include, but are not limited to, styryl, benzyl and cumyl.

The propenyl group may occur as trans- and cis-isomers. For the purposes of the present invention, these isomers may be used independently or as a mixture.

For A, suitable unsubstituted or substituted alkylene groups include, for example, ethylene, propylene, butylene, and isobutylene. The polyoxyalkylene group —(AO)$_n$— can be a homo-, block or random polymer, or a mixture thereof.

The conditions of the reaction for producing the substituted phenyl surfactant of the present invention are not critical. For example, the substituted phenyl surfactant can be produced by adding an alkylene oxide such as ethylene oxide (EO) or propylene oxide (PO) to an alkylated propenyl phenol in the usual manner, sulfating the addict with a sulfating agent such as sulfuric acid, sulfamic acid, chlorosulfonic acid, or the like, followed by neutralizing with an alkaline substance.

A currently preferred group of substituted phenyl compounds are those compounds having the formula:

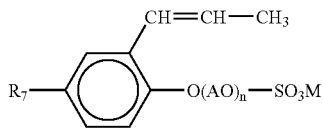

wherein $R_7$, A, M and n is as defined above. More preferred compounds are those wherein $R_7$ is alkyl, A is ethylene (—CH$_2$CH$_2$—), and M is alkali metal or ammonium. Most preferred compounds are those wherein M is ammonium, $R_7$ is nonyl, and n is about 10 to about 30, such as the compounds available from Dai-Ichi Kogyo Seiyaku Co., Ltd. (Tokyo, Japan) under the tradename Hitenol BC.

The polyoxyalkylene-1-(allyloxymethyl)alkyl ether sulfate salt compounds that can be employed as water-soluble or water-dispersible polymerizable surfactants according to the invention include those disclosed in Japanese Pat. No. JP 2596441 B2 (Dai-Ichi Kogyo Seiyaku Co., Ltd.).

Suitable polyoxyalkylene-1-(allyloxymethyl)alkyl ether sulfate salt compounds include compounds having the formula:

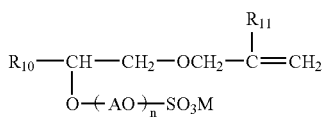

wherein $R_{10}$ is a linear or branched alkyl group containing 8 to 30 carbon atoms, preferably 8 to 14 carbon atoms, and more preferably 10 to 12 carbon atoms; $R_{11}$ is hydrogen or methyl, preferably hydrogen; A is an unsubstituted or substituted alkylene group having 2 to 4 carbon atoms; n is 0 or an integer of 1 to about 200, preferably 2 to about 100, more preferably 2 to about 30; and M is an alkali metal, an ammonium ion, or an alkanolamine residue. Examples of alkanolamine residues include monoethanolamine, triethanolamine, and the like.

For A, suitable unsubstituted or substituted alkylene groups include, for example, ethylene, propylene, butylene, and isobutylene. The polyoxyalkylene group —(AO)$_n$— can be a homo-, block or random polymer, or a mixture thereof.

The polyoxyalkylene-1-(allyloxymethyl)alkyl ether sulfate salt compounds of the invention can be prepared according to the methods described in Japanese Pat. No. JP 2596441 B2.

A currently preferred group of polyoxyalkylene-1-(allyloxymethyl) alkyl ether sulfate salt compounds are those compounds having the formula:

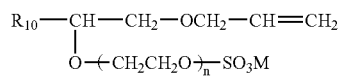

wherein $R_{10}$ is an alkyl group containing 8 to 14 carbon atoms, and preferably 10 to 12 carbon atoms; n is an integer of 1 to about 200, preferably 2 to about 100, more preferably 2 to about 30; and M is an alkali metal, an ammonium ion, or an alkanolamine residue. More preferred compounds are those wherein $R_{10}$ is a decyl or dodecyl group, n is 5 to 10, and M is NH$_4$, such as the compounds available from Dai-Ichi Kogyo Seiyaku Co., Ltd. (Tokyo, Japan) under the trademark Hitenol® KH.

The total amount of water-soluble or water-dispersible polymerizable surfactant utilized in the preparation of the removable, water-whitening resistant pressure sensitive adhesives of the invention is based on the total weight of monomers (a), (b), (c), and (d) and is about 0.1 to about 5 wt. %, preferably about 0.5 to about 2 wt. %.

The process for the preparation of the removable, water-whitening resistant pressure sensitive adhesives of the invention optionally uses, and the crosslinked aqueous emulsion polymer of the invention optionally comprises, a non-polymerizable surfactant in addition to the polymerizable surfactant of the invention. Non-polymerizable emulsifiers, i.e. surfactants, that can be employed include anionic, nonionic, cationic, or amphoteric emulsifiers and mixtures thereof. Ionic emulsifiers are currently preferred, with anionic emulsifiers being currently most preferred. Examples of suitable anionic emulsifiers include, but are not limited to, alkyl aryl sulfonates (e.g. sodium dodecylbenzene sulfonate), alkyl sulfates (e.g. sodium dodecyl sulfate, ammonium dodecyl sulfate), sulfates of ethoxylated alcohols (e.g. sodium lauryl ether sulfate), sulfates and sulfonates of ethoxylated alkylphenols (e.g. ammonium nonylphenol ether (EO=30) sulfate, sodium salt of alkylaryl polyether sulfonates), sulfosuccinates (e.g. sodium dioctyl sulfosuccinate), diphenyl sulfonates (e.g. sodium dodecyl diphenyloxide disulfonate), and mixtures thereof. Examples of suitable nonionic emulsifiers include, but are not limited to, ethoxylated alcohols (e.g. ethoxylated oleyl alcohol), ethoxylated alkylphenols (e.g. nonylphenol ethoxylate), and mixtures thereof. Examples of suitable cationic emulsifiers include, but are not limited to, ethoxylated fatty amines (e.g. ethoxylated tallow amine).

It is currently preferred that an ionic non-polymerizable surfactant is used in conjunction with the polymerizable surfactants of the present invention for the preparation of the crosslinked aqueous emulsion polymer of the invention to be used in the removable, water-whitening resistant pressure sensitive adhesives of the invention.

When used, the typical concentration of non-polymerizable surfactant is based on the total weight of monomers (a), (b), (c), and (d) and is about 0.1 to about 2 wt. %, preferably about 0.1 to about 1 wt. %.

The process for the preparation of the removable, water-whitening resistant pressure sensitive adhesives of the invention also utilizes at least one water-soluble polymerization initiator. Any conventional water-soluble polymerization initiator that is normally acceptable for emulsion polymerization of acrylate monomers may be used and such polymerization initiators are well known in the art. The typical concentration of water-soluble polymerization initiators is about 0.01 wt. % to about 1 wt. %, preferably about 0.01 wt. % to about 0.5 wt. %, of the total weight of monomers (a), (b), (c), and (d) charged in the pre-emulsion. The water soluble polymerization initiators can be used alone or used in combination with one or more conventional reducing agents, such as bisulfites, metabisulfites, ascorbic acid, sodium formaldehyde sulfoxylate, ferrous sulfate, ferrous ammonium sulfate, ferric ethylenediamine-tetraacetic acid, and the like. Water-soluble polymerization initiators that can be employed according to the invention include water soluble persulfates, peroxides, azo compounds and the like, and mixtures thereof. Examples of water soluble initiators include, but are not limited to, persulfates (e.g. potassium persulfate, and sodium persulfate), peroxides (e.g. hydrogen peroxide, and tert-butyl hydroperoxide), and azo compounds (e.g. 4,4'-azobis(4-cyano-pentanoic acid), V-501 from Wako Chemicals). Currently the preferred water soluble polymerization initiators are the persulfates, particularly potassium persulfate.

The polymerization can be initiated by any conventional method known to those skilled in the art, such as by application of heat or radiation. The method of initiation will be dependent on the water-soluble polymerization initiator used and will be readily apparent to those skilled in the art.

The water soluble polymerization initiator can be added to the polymerization reaction in any conventional manner known in the art. It is currently preferred to add a portion of the initiator to the initial reactor charge which comprises water, an effective amount of the water-soluble or water-dispersible polymerizable surfactant, and an initial amount of the polymerization initiator. The remainder of the initiator can be added continuously or incrementally during the emulsion polymerization. It is currently preferred to incrementally add the remaining initiator.

Following polymerization, the pH of the latex emulsion is adjusted by contacting the latex emulsion with a suitable base in an amount necessary to raise the pH to at least 6, preferably about 6.5 to about 9, and more preferably about 7 to about 8. Examples of suitable bases for adjusting the pH of the latex emulsion include alkali metal hydroxides, alkaline earth metal hydroxides, ammonium hydroxide, amines, and the like, and mixtures thereof The currently preferred base for use in the invention is ammonium hydroxide.

The latex emulsion typically has a solids content of from about 40 to about 70 wt. %, and preferably about 45 to about 55 wt. %.

The polymerization reaction can be conducted in any conventional reaction vessel capable of an emulsion polymerization.

The polymerization can be conducted at a temperature typical for emulsion polymerizations. The polymerization is preferably conducted at a temperature in the range of about 50° C. to about 95° C., preferably in the range of about 60° C. to about 85° C.

The polymerization time is that time needed to achieve the desired conversion based on the other reaction conditions, e.g. temperature profile, and reaction components, e.g. monomers, initiator, etc. The polymerization time will be readily apparent to those skilled in the art.

The crosslinking agent used in the PSA composition of the present invention is a polyhydrazide compound having at least two hydrazide, i.e. NH—NH$_2$, groups which are reactable with an aldehyde or ketone group in the mono-olefinically unsaturated monomers having an aldehyde or ketone group.

Examples of suitable polyhydrazide compounds include dihydrazides, such as those represented by the formula

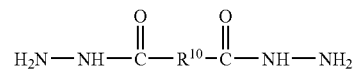

wherein $R^{10}$ is selected from a linear or branched divalent alkylene group having 0 to about 10 carbon atoms, preferably 2 to 10 carbon atoms, a divalent alicyclic group having 4 to about 8 carbon atoms, a divalent aromatic ring, or

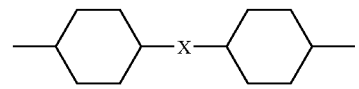

wherein the rings are alicyclic or aromatic and X is selected from —O—, —S—, —SO$_2$—, or —C(O)—; bis-semicarbizides, such as those represented by the formula

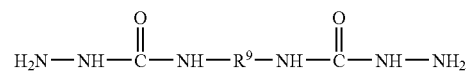

wherein $R^9$ is a divalent straight-chain or branched alkylene group having 2 to about 7 carbon atoms or a divalent carbocyclic group having 6 to 8 carbon atoms, e.g. o-, m-, or p-phenylene, tolylene, cyclohexylene or methylcyclohexylene; trihydrazides, such as those represented by the formula wherein $R^5$—$R_9$ are independently selected from H or OH, p is an integer from 0 to 3, and q is an integer from 2 to 8, provided p+q$\leq$8 and p<q; aliphatic tetrahydrazides such as ethylenediaminetetraacetic acid tetrahydrazide; and aromatic polycarboxylic polyhydrazides, e.g. pyrometallic acid trihydrazide or pyrometallic acid tetrahydrazide; and mixtures thereof.

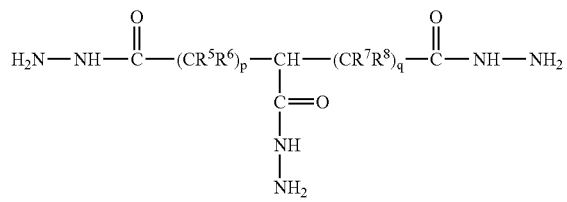

Specific examples of the above polyhydrazide compounds include, but are not limited to, oxalic acid dihydrazide, malonic acid dihydrazide, succinic acid dihydrazide, glutaric acid dihydrazide, adipic acid dihydrazide, sebacic acid dihydrazide; monoolefin unsaturated dicarboxylic acid dihydrazide such as maleic acid dihydrazide, fumaric acid dihydrazide, itaconic acid dihydrazide; carbonic acid polyhydrazide such as carbonic acid aihydrazide; aromatic dihydrazides such as phthalic acid dihydrazide, terephthalic acid dihydrazide, isophthalic acid dihydrazide; trihydrazides such as 1,2,4-butanetricarbohydrazide, 1,1,4-butanetricarbohydrazide, 1,2,5-pentanetricarbohydrazide, 1,3,6-hexanetricarbohydrazide, 1,3,7-heptanetri-carbohydrazide, and 1-hydroxy-1,2,4-butanetricarbohydrazide; and mixtures thereof.

The currently preferred polyhydrazides are the aliphatic dicarboxylic acid dihydrazides, such as adipic acid dihydrazide.

Polyhydrazides are typically obtained as the reaction product of hydrazine and a polyfunctional organic carboxylic acid (or its corresponding ester, amide, acyl halide or anhydride). The polyfunctional organic carboxylic acid may be aliphatic or aromatic in nature and may contain a branched or linear backbone. This and other hydrazinolysis reactions are described in "The Chemistry of Hydrazides," H. Paulsen and D. Stoye, Chapter 10, pp. 515–600 in "The Chemistry of Amides", H. Zabicky, Ed., Interscience Publishers, New York, N.Y., 1970.

An effective amount of the polyhydrazide compound used as the crosslinking agent in the PSA composition of the present invention is such that an amount of hydrazide groups is in the range of 0.02 to 5 equivalents, preferably 0.1 to 3 equivalents, and more preferably 0.5 to 2 equivalents, per one equivalent of ketone or aldehyde group contained in the mono-olefinically unsaturated monomers having an aldehyde or ketone group that is present in the copolymer aqueous emulsion.

The polyhydrazide compound used as the crosslinking agent in the PSA composition can be added to the aqueous emulsion polymer during the polymerization process, at the end of the polymerization process, or during the formulation of the pressure sensitive adhesive. It is currently preferred to add the polyhydrazide compound during the formulation of the pressure sensitive adhesive.

EXAMPLES

Abbreviations and Source of Materials

2-EHA: 2-ethylhexyl acrylate; Ashland Inc.
BA: butyl acrylate; Ashland Inc.
ST: styrene; Shell Chemicals LP
EA: ethyl acrylate; Ashland Inc.
MA: methyl acrylate; Ashland Inc.
HEA: 2-hydroxyethyl acrylate; Ashland Inc.
AA: acrylic acid; Ashland Inc.
DAAM: diacetone acrylamide; Kyowa Hakko USA, Inc.
ADH: adipic acid dihydrazide; Kyowa Hakko USA, Inc.
Hitenol BC-2020: 20% active in water, n is about 20;

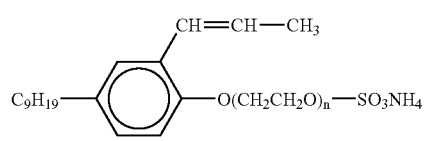

Dai-Ichi Kogyo Seiyaku Co., Ltd.
PPS: potassium persulfate; Sigma-Aldrich Co.

$NH_4OH$: Ammonium hydroxide (28%); Sigma-Aldrich Co.
Abex sulfated nonylphenoxy-poly(ethyleneoxy)ethanol (30% active);
EP-120: Rhodia
AOT-75: sodium dioctyl sulfosuccinate (75% active); Cytec
L-22: ammonium lauryl sulfate (30% active); Rhodia
CO-660: Igepal CO 660—nonyl phenol ethoxylate (10 moles EO); Rhodia
BOPP: biaxially oriented polypropylene film; Intex
BDDM: butanediol dimethacrylate; Sigma-Aldrich Co.
DS-4: sodium dodecylbenzene sulfonate (22% active); Rhodia
SBC: sodium bicarbonate; Sigma-Aldrich Co.
TBHP: tert-butyl hydroperoxide; Akzo-Nobel
Formapon: sodium formaldehyde sulfoxylate; Henkel

Example 1

In a 2L jacketed glass reactor equipped with a reflux condenser, thermocouple and four-blade agitator, 1000.0 g of polyacrylate latex was prepared. Monomer pre-emulsion was prepared by mixing 134.7 g water, 258.3 g 2-EHA, 89.8 g BA, 53.9 g MA, 10.3 g HEA, 13.5 g AA and 23.4 g DAAM with 25.8 g Hitenol BC-2020 and 1.2 g AOT. The reactor was charged with 334.5 g water, 1.6 g PPS and 3.6 g Hitenol BC-2020. Separately, 44.5 g of PPS stock solution (2.5 wt. % concentration) was prepared in water. The reactor was heated with water. When the temperature reached 78° C., continuous addition of the monomer pre-emulsion and the PPS stock solution commenced at rates of 3.0 g/min and 13.4 ml/hr, respectively, for 200 minutes. The temperature was maintained at 83° C. and the polymerization charge agitated continuously from 200–350 rpm. After the pre-emulsion addition was complete, the reactor temperature was raised to 86° C. and agitated for an additional 40 minutes. The reactor was cooled to 30° C., 0.11 g Kathon LX biocide (Rohm and Haas) was added to the reactor and the pH was adjusted between 7–8 using 28% $NH_4OH$ aqueous solution.

Examples 2–6

Examples 2–6 were polymerized according to the procedure described in Example 1 except the monomer concentrations were adjusted as outlined in Table 1.

TABLE 1

| | Example | | | | |
|---|---|---|---|---|---|
| | 2 (Control) | 3 (Invention) | 4 (Control) | 5 (Invention) | 6 (Invention) |
| 2-EHA | 259.2 | 258.3 | 258.3 | 0.0 | 258.3 |
| BA | 98.8 | 146.0 | 110 | 359.3 | 94.3 |
| EA | 0.0 | 0.0 | 0.0 | 0.0 | 53.9 |
| MA | 53.9 | 0.0 | 53.9 | 53.9 | 0.0 |
| HEA | 10.3 | 9.0 | 0.0 | 0.0 | 12.6 |
| AA | 13.5 | 13.5 | 4.5 | 13.5 | 11.2 |
| DAAM | 13.5 | 22.5 | 22.5 | 22.5 | 18.9 |

Example 7 (Control)

Example 7 was polymerized according to the procedure described in Example 1 except the pre-emulsion was prepared by mixing 134.2 g water, 260.4 g 2-EHA, 89.5 g BA, 53.7 g MA, 10.3 g HEA, 13.4 g AA and 20.1 g DAAM with 6.0 g L-22, 3.6 g CO-660 and 1.8 g AOT. The reactor was charged with 350.2 g water, 1.6 g PPS and 6.0 g L-22.

Example 8

In a 2L jacketed glass reactor equipped with a reflux condenser, thermocouple and four-blade agitator, 1000.0 g of polyacrylate latex was prepared. Monomer pre-emulsion was prepared by mixing 140.7 g water, 269.7 g 2-EHA, 93.8 g BA, 56.3 g MA, 10.8 g HEA, 14.1 g AA and 24.4 g DAAM with 27.0 g Hitenol BC-2020 and 1.3 g AOT. The reactor was charged with 306.6 g water, 1.6 g PPS and 2.3 g Hitenol BC-2020. Separately, 46.4 g of PPS stock solution (2.5 wt. % concentration) was prepared in water. The reactor was heated with water. When the temperature reached 78° C., continuous addition of the monomer pre-emulsion and the PPS stock solution commenced at rates of 3.2 g/min and 14.5 ml/hr, respectively, for 200 minutes. The temperature was maintained at 83° C. and the polymerization charge agitated continuously from 200–350 rpm. After the pre-emulsion addition was complete, the reactor temperature was raised to 86° C. and agitated for an additional 40 minutes. The reactor was cooled to 30° C., 0.11 g Kathon LX was added to the reactor and the pH was adjusted between 7–8 using 28% NH4OH aqueous solution.

Example 9 (Control)

In a 2L jacketed glass reactor equipped with a reflux condenser, thermocouple and four-blade agitator, 1000.0 g of polyacrylate latex was prepared. Monomer pre-emulsion was prepared by mixing 146.7 g water, 281.1 g 2-EHA, 97.8 g BA, 58.7 g MA, 11.2 g HEA, 14.7 g AA and 25.4 g DAAM with 28.1 g Hitenol BC-2020 and 1.3 g AOT. The reactor was charged with 279.1 g water, 1.7 g PPS and 0.5 g Hitenol BC-2020. Separately, 48.4 g of PPS stock solution (2.5 wt. % concentration) was prepared in water. The reactor was heated with water. When the temperature reached 78° C., continuous addition of the monomer pre-emulsion and the PPS stock solution commenced at rates of 3.3 g/min and 15.1 ml/hr, respectively, for 200 minutes. The temperature was maintained at 83° C. and the polymerization charge agitated continuously from 200–350 rpm. After the pre-emulsion addition was complete, the reactor temperature was raised to 86° C. and agitated for an additional 40 minutes. The reactor was cooled to 30° C., 0.11 g Kathon LX was added to the reactor and the pH was adjusted between 7–8 using 28% NH4OH aqueous solution.

Example 10

In a 2L jacketed glass reactor equipped with a reflux condenser, thermocouple and four-blade agitator, 1000.0 g of polyacrylate latex was prepared. Monomer pre-emulsion was prepared by mixing 152.5 g water, 292.2 g 2-EHA, 101.6 g BA, 61.0 g MA, 11.7 g HEA, 15.2 g AA and 26.4 g DAAM with 29.2 g Hitenol BC-2020 and 1.4 g AOT. The reactor was charged with 249.3 g water, 1.8 g PPS and 1.9 g Hitenol BC-2020. Separately, 50.3 g of PPS stock solution (2.5 wt. % concentration) was prepared in water. The reactor was heated with water. When the temperature reached 78° C., continuous addition of the monomer pre-emulsion and the PPS stock solution commenced at rates of 3.5 g/min and 15.7 ml/hr, respectively, for 200 minutes. The temperature was maintained at 83° C. and the polymerization charge agitated continuously from 200–350 rpm. After the pre-emulsion addition was complete, the reactor temperature was raised to 86° C. and agitated for an additional 40 minutes. The reactor was cooled to 30° C., 0.11 g Kathon LX was added to the reactor and the pH was adjusted between 7–8 using 28% NH4OH aqueous solution.

Example 11
(Control: U.S. Pat. No. 4,529,772, EX. 10)

In a 2L jacketed glass reactor equipped with a reflux condenser, thermocouple and four-blade agitator, 930.0 g of polyacrylate latex was prepared. Monomer pre-emulsion was prepared by mixing 170.2 g water, 227.3 g 2-EHA, 177.3 g BA, 22.8 g styrene, 9.1 g AA and 18.2 g DAAM with 30.3 g EP-120. The reactor was charged with 200.0 g water, 0.5 g PPS and 39.3 g pre-emulsion. Separately, 74.6 g of PPS stock solution (2.5 wt. % concentration) was prepared in water. The reactor was heated with water. When the temperature reached 85° C., continuous addition of the monomer pre-emulsion and the PPS stock solution commenced at rates of 3.5 g/min and 24.9 ml/hr, respectively, for 180 minutes. The temperature was maintained at 85° C. and the polymerization charge agitated continuously from 150–280 rpm. After the pre-emulsion addition was complete, the reactor temperature was maintained at 85° C. and agitated for an additional 60 minutes. The reactor was cooled to 30° C. and the pH was adjusted between 7–8 using 28% NH$_4$OH aqueous solution.

Example 12
(Control: U.S. Pat. No. 5,763,555, EX. 1)

In a 2L jacketed glass reactor equipped with a reflux condenser, thermocouple and four-blade agitator, 987.7 g of polyacrylate latex was prepared. Monomer pre-emulsion was prepared by mixing 197.3 g deionized water, 470.0 g 2-EHA, 10.0 g acrylamide (50%) (Cytec) and 25.2 g BDDM with 22.7 g DS-4 (22%) and 1.25 g SBC. The reactor was charged with 175 g deionized water. Separately, 25.3 g of sodium bisulfite stock solution (1.2 wt. % concentration) and 25.5 g PPS stock solution (3.9 wt. % concentration) were prepared in deionized water. The deionized water in the reactor was purged with nitrogen and heated with water. When the temperature reached 74° C., the nitrogen line was repositioned above the fluid and 21.8 g pre-emulsion, 1.3 g sodium bisulfite stock solution and 1.3 g of PPS stock solution were added to the reactor. When the temperature reached 78° C., continuous addition of the monomer pre-emulsion, the sodium bisulfite stock solution and the PPS stock solution commenced at rates of 3.9 g/min, 8.0 ml/hr and 8.0 ml/hr, respectively, for 180 minutes. The temperature was maintained at 78° C. and the polymerization charge agitated continuously from 200–250 rpm. After the pre-emulsion addition was complete, the reactor temperature was raised to 80° C. and agitated for an additional 60 minutes. After the holding period, 3.8 g TBHP stock solution (13.2 wt. % concentration) and 3.8 g Formapon stock solution (13.2 wt. % concentration) were added to the reactor and mixed for fifteen minutes. The reactor was cooled to 30° C. after which 28.0 g Kathon LX solution (3.6 wt. % concentration) was added to the reactor. The pH was adjusted between 7–8 using 28% NH$_4$OH aqueous solution.

Example 13

Formulation and Testing

The latex was formulated with adipic dihydrazide (ADH) according to the levels listed in Table 2. The formulated latex sample listed as Example 13 (Control) in Table 2 is the latex of Example 6 with no added ADH. The average particle size of each formulation was measured using a Horiba laser scattering particle size distribution analyzer model LA-910.

The formulated latex was direct coated on a 1.0 mil corona treated BOPP film. The film was air dried for 15 minutes and heat dried at 90° C. for 5 minutes. The coated BOPP was laminated to a silicone release liner. The laminate construction was conditioned for 72 hours at 72±2° F. and 50±2% RH (CTH conditions) prior to 180° dynamic peel and water whitening tests. The release liner was removed and four 1"×5.5" test strips were bonded to stainless steel panels for 24 hours (1 sample) and 1 week (3 samples). The one week samples were exposed to either CTH conditions, 70° C. or 38° C./98% RH. Heat and humidity aged samples were reconditioned for 1 hour at CTH conditions prior to 180° dynamic peel testing. The tests were run in duplicate. Average Peel strength in lb/in was determined on an Instron Test Machine (Model No. 1125) by peeling a strip from a plate at an 180° angle. In reporting results, the mode of the peel failure is identified as follows: "A" meaning adhesive failure, i.e. adhesive entirely separates from the substrate, "C" meaning cohesive failure where the adhesive is left half on the substrate and half on the face stock, "T" meaning transfer failure where the adhesive is all transferred to the substrate. A peel failure mode of "A" is acceptable. A peel failure mode of "C" or "T" is unacceptable as adhesive is left on the substrate.

The water-whitening test was performed by immersing the adhesive coated BOPP film in water such that the adhesive layer was in direct contact with the water. After 24 hours of immersion, visual inspection of the coated film was performed. A zero-rating represents no whitening of the adhesive, whereas, a rating of five indicates a milky-white film. Numbers from 1 to 5 represent increasing levels of whitening. A rating of less than three is an acceptable level of adhesive water-whitening.

The results demonstrate that the crosslinked PSAs of the invention are removable (acceptable peel strength and adhesive failure mode) and water-whitening resistant (whitening rating less than 3), whereas the control samples are unacceptable because they either are not water-whitening resistant or they are not removable (have unacceptable adhesive failure mode).

TABLE 2

| | Example No.: | | | | | | | | | | | | |
|---|---|---|---|---|---|---|---|---|---|---|---|---|---|
| | 1 INV | 2 CON | 3 INV | 4 CON | 5 INV | 6 INV | 7 CON | 8 INV | 9 CON | 10 INV | 11 CON | 12 CON | 13 CON |
| Surfactant: | | | | | | | | | | | | | |
| L-22 | | | | | | | 0.8 | | | | | | |
| Abex EP-120 | | | | | | | | | | | 2 | | |
| BC-2020 | 1.3 | 1.3 | 1.3 | 1.3 | 1.3 | 1.3 | | 1.25 | 1.2 | 1.2 | | | 1.3 |
| AOT | 0.2 | 0.2 | 0.2 | 0.2 | 0.2 | 0.2 | 0.3 | 0.2 | 0.2 | 0.2 | | | 0.2 |
| CO-660 | | | | | | | 0.8 | | | | | | |
| DS-4 | | | | | | | | | | | | 1 | |
| Monomer: | | | | | | | | | | | | | |
| 2-EHA | 57.5 | 57.7 | 57.5 | 57.5 | | 57.5 | 58.2 | 57.5 | 57.5 | 57.5 | 50 | 94 | 57.5 |
| BA | 20 | 22 | 32.5 | 24.5 | 80 | 21 | 20 | 20 | 20 | 20 | 39 | | 21 |
| ST | | | | | | | | | | | 5 | | |
| EA | | | | | | 12 | | | | | | | 12 |
| MA | 12 | 12 | | 12 | 12 | | 12 | 12 | 12 | 12 | | | |
| HEA | 2.3 | 2.3 | 2 | | | 2.8 | 2.3 | 2.3 | 2.3 | 2.3 | | | 2.8 |
| AA | 3 | 3 | 3 | 1 | 3 | 2.5 | 3 | 3 | 3 | 3 | 2 | | 2.5 |
| DAAM | 5.2 | 3 | 5 | 5 | 5 | 4.2 | 4.5 | 5.2 | 5.2 | 5.2 | 4 | | 4.2 |
| Acrylamide/ BDDM | | | | | | | | | | | | 1/5 | |
| Crosslinker: ADH | 2.3 | 1.3 | 2.3 | 2.3 | 2.3 | 1.9 | 2 | 2.3 | 2.3 | 2.3 | 1.8 | 0 | 0 |
| Particle Size (nm) | 83 | 87 | 89 | 89 | 89 | 92 | 76 | 103 | 475 | 143 | 157 | 467 | 92 |
| Whitening: | 0 | 4 | 0.1 | 3 | 1.5 | 0 | 4 | 0 | 3 | 0 | 4 | 5 | 0.5 |
| BOPP film: | | | | | | | | | | | | | |
| PL24 | | | 0.19 A | 0.23 A | 0.67 A | 0.37 A | 0.49 A | 0.40 A | 0.37 A | 0.54 A | 0.48 A | 0.35 A | 1.29 A |
| PL1W | | | 0.29 A | 0.33 A | 0.76 A | 0.53 A | 0.58 A | 0.53 A | 0.52 A | 0.70 A | 0.56 A | 0.34 A | 2.45 C |
| PL1W (70° C.) | 0.87 A | 1.13 A | 0.67 A | 0.70 A | 1.38 A | 0.76 A | 0.93 A | 0.91 A | 0.79 A | 0.98 A | 1.14 A | 0.32 A | 1.70 T |
| PL1W (98%) | 0.74 A | 0.96 A | 0.57 A | 0.61 A | 0.66 A | 0.72 A | 0.89 A | 0.79 A | 0.69 A | 0.84 A | 0.90 A | 0.08 A | 1.53 T |

INV = invention sample;
CON = control sample.

We claim:

1. A removable, water-whitening resistant pressure sensitive adhesive comprising a crosslinked aqueous emulsion polymer comprising:

(a) at least one hydrophobic monomer selected from an alkyl (meth)acrylate ester of an alcohol wherein the alkyl portion of the alcohol is linear or branched and contains at least 4 carbon atoms, or a mixture of at least one styrenic monomer and at least one alkyl (meth) acrylate ester of an alcohol wherein the alkyl portion of the alcohol is linear or branched and contains at least 4 carbon atoms, wherein when a styrenic monomer is present, said styrenic monomer is present in an amount up to about 30 wt. % of the total hydrophobic monomer mixture;
(b) greater than 1 wt. % of at least one hydrophilic monomer;
(c) greater than 3 wt. % of at least one mono-olefinically unsaturated monomer having an aldehyde or ketone group;
(d) optionally at least one partially hydrophilic monomer selected from alkyl (meth)acrylate esters of an alcohol wherein the alkyl portion of the alcohol has 1 to 2 carbon atoms, N-vinyl-2-pyrrolidone, or mixtures thereof; and
(e) an effective amount of at least one water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof;
wherein said crosslinked aqueous emulsion polymer is crosslinked with at least one polyhydrazide crosslinker, the wt. % of monomers (a), (b), (c) and (d) are based on the total weight of monomers (a), (b), (c) and (d), and the mean particle size of said crosslinked aqueous emulsion polymer is less than about 400 nm.

2. The composition of claim 1 wherein the amount of monomer (a) in said crosslinked aqueous emulsion polymer is about 50 to about 95 wt. %.

3. The composition of claim 2 wherein the amount of monomer (a) in said crosslinked aqueous emulsion polymer is about 70 to about 90 wt. %.

4. The composition of claim 1 wherein the amount of monomer (b) in said crosslinked aqueous emulsion polymer is about 2 to about 10 wt. %.

5. The composition of claim 4 wherein the amount of monomer (b) in said crosslinked aqueous emulsion polymer is about 3 to about 8 wt. %.

6. The composition of claim 1 wherein the amount of monomer (c) in said crosslinked aqueous emulsion polymer is about 3.5 to about 20 wt. %.

7. The composition of claim 1 wherein the amount of monomer (d) in said crosslinked aqueous emulsion polymer is 0 to about 45 wt. %.

8. The composition of claim 7 wherein the amount of monomer (d) in said crosslinked aqueous emulsion polymer is about 5 to about 25 wt. %.

9. The composition of claim 1 wherein the pH of said aqueous emulsion polymer is at least 6.

10. The composition of claim 9 wherein the pH of said aqueous emulsion polymer is about 6.5 to about 9.

11. The composition of claim 1 wherein said removable, water-whitening resistant pressure sensitive adhesive has a peel strength of less than about 2.5 pounds per inch peel force with adhesive failure mode when said composition is applied to polypropylene.

12. The composition of claim 1 wherein said monomer (a) is selected from isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, isononyl acrylate, isodecyl acrylate, or mixtures thereof.

13. The composition of claim 12 wherein said monomer (a) is selected from n-butyl acrylate, 2-ethylhexyl acrylate, or mixtures thereof.

14. The composition of claim 1 wherein said monomer (b) is selected from a monoolefinic monocarboxylic acid, a monoolefinic dicarboxylic acid, 2-hydroxyethyl acrylate, or mixtures thereof.

15. The composition of claim 14 wherein said monomer (b) is selected from acrylic acid, methacrylic acid, fumaric acid, maleic acid, itaconic acid, crotonic acid, 2-hydroxyethyl acrylate, or mixtures thereof.

16. The composition of claim 15 wherein said monomer (b) is selected from acrylic acid, 2-hydroxyethyl acrylate, or mixtures thereof.

17. The composition of claim 1 wherein said monomer (c) is selected from acrolein, methacrolein, vinylbenzaldehyde, crotonaldehyde, (meth)acryloxyalkyl-propanals represented by the formula $$H_2C=C(R^1)-C(=O)-O-C(R^2)(R^3)-C(R^4)(H)-C(H)=O$$

where $R^1$ is —H or —$CH_3$, $R^2$ is —H or alkyl of 1 to 3 carbon atoms, $R^3$ is alkyl of 1 to 3 carbon atoms, and $R^4$ is alkyl of 1 to 4 carbon atoms, vinyl acetoacetate, allyl acetoacetate, vinyl methyl ketone, vinylbenzene methyl ketone, acetoacetoxyethyl methacrylate, vinyl ethyl ketone, vinyl isobutyl ketone, vinyl butyl ketone, diacetone (meth)acrylamide, diacetone (meth)acrylate, acetonyl acrylate, 2-hydroxypropyl acrylate-acetyl acetate, 1,4-butanediol acrylate-acetyl acetate, or mixtures thereof.

18. The composition of claim 17 wherein said monomer (c) is selected from diacetone acrylamide, diacetone acrylate, acrolein, or mixtures thereof.

19. The composition of claim 1 wherein said polymerizable surfactant has a hydrophilic portion selected from a sulfonate allyl amine moiety, a sulfate allyl amine moiety, or a phosphate allyl amine moiety, and a hydrophobic portion selected from -R, or a group having the formula RO—$(CH_2CH_2O)_n$—; wherein R is an alkyl group or an alkyl-substituted phenyl group wherein the alkyl group has 1 to 20 carbon atoms, and n is an integer from 2 to 100.

20. The composition of claim 1 wherein said polymerizable surfactant is an allyl amine salt of an alkyl benzene sulfonate having the formula $$R_1-\text{C}_6\text{H}_4-SO_3^- X^+ \text{-CH}_2\text{-CH=CH}_2$$

wherein $R_1$ is an alkyl group having 1 to 20 carbon atoms, and $X^1$ is selected from $^+NH_3$, $^+NH_2R_4$, or $^{+NHR}{}_4R_5$, wherein $R_4$ and $R_5$ are independently selected from $C_1$–$C_4$ alkyl or hydroxyalkyl groups.

21. The composition of claim 20 wherein said polymerizable surfactant is an allyl amine salt of dodecylbenzene sulfonate.

22. The composition of claim 1 wherein said polyhydrazide is selected from dihydrazides, trihydrazides, tetrahydrazides, bis-semicarbizides, aromatic polycarboxylic polyhydrazides, or mixtures thereof.

23. The composition of claim 22 wherein said polyhydrazide is selected from dihydrazides represented by the formula

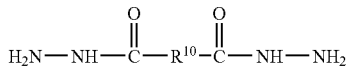

wherein $R^{10}$ is selected from a linear or branched divalent alkylene group having 0 to about 10 carbon atoms, preferably 2 to 10 carbon atoms, a divalent alicyclic group having 4 to about 8 carbon atoms, a divalent aromatic ring, or

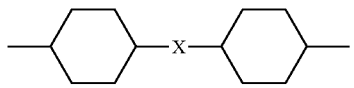

wherein the rings are alicyclic or aromatic and X is selected from —O—, —S—, —SO$_2$—, or —C(O)—; bis-semicarbizides represented by the formula

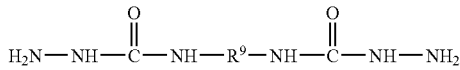

wherein $R^9$ is a divalent straight-chain or branched alkylene group having 2 to about 7 carbon atoms or a divalent carbocyclic group having 6 to 8 carbon atoms; trihydrazides represented by the formula

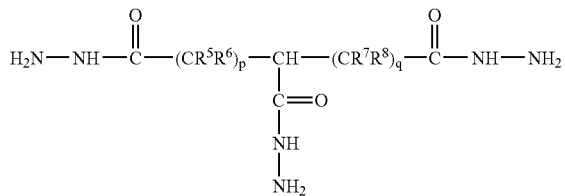

wherein $R^5$–$R^8$ are independently selected from H or OH, p is an integer from 0 to 3, and q is an integer from 2 to 8, provided p≦q≦8 and p<q; or mixtures thereof.

24. The composition of claim 23 wherein said polyhydrazide is selected from oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, carbonic acid dihydrazide, phthalic acid dihydrazide, terephthalic acid dihydrazide, isophthalic acid dihydrazide, 1,2,4-butanetricarbohydrazide, 1,1,4-butanetricarbohydrazide, 1,2,5-pentanetricarbohydrazide, 1,3,6-hexane-tricarbohydrazide, 1,3,7-heptanetricarbohydrazide, 1-hydroxy- 1,2,4-butanetricarbohydrazide, or mixtures thereof.

25. The composition of claim 22 wherein said polyhydrazide is an aliphatic dicarboxylic acid dihydrazide.

26. The composition of claim 25 wherein said polyhydrazide is adipic acid dihydrazide.

27. A removable, water-whitening resistant pressure sensitive adhesive comprising a crosslinked aqueous emulsion polymer comprising:

(a) about 70 to about 90 wt. % of at least one hydrophobic monomer selected from an alkyl (meth)acrylate ester of an alcohol wherein the alkyl portion of the alcohol is linear or branched and contains at least 4 carbon atoms, or a mixture of at least one styrenic monomer and at least one alkyl (meth)acrylate ester of an alcohol wherein the alkyl portion of the alcohol is linear or branched and contains at least 4 carbon atoms, wherein when a styrenic monomer is present, said styrenic monomer is present in an amount up to about 30 wt. % of the total hydrophobic monomer mixture;

(b) about 2 to about 10 wt. % of at least one hydrophilic monomer;

(c) greater than 3 to about 20 wt. % of at least one mono-olefinically unsaturated monomer having an aldehyde or ketone group;

(d) 0 to about 45 wt. % of at least one partially hydrophilic monomer selected from alkyl (meth)acrylate esters of an alcohol wherein the alkyl portion of the alcohol has 1 to 2 carbon atoms, N-vinyl-2-pyrrolidone, or mixtures thererof; and (e) about 0.1 to about 5 wt. % of at least one water-soluble or water-dispersible polymerizable surfactant selected from compounds having a terminal allyl amine moiety, substituted phenyl compounds having at least one alkenyl substituent, polyoxyalkylene-1-(allyloxymethyl) alkyl ether sulfate salts, or mixtures thereof;

wherein said crosslinked aqueous emulsion polymer is crosslinked with at least one polyhydrazide crosslinker, the wt. % of monomers (a), (b), (c) and (d) and the wt. % of polymerizable surfactant (e) are based on the total weight of monomers (a), (b), (c) and (d), and the mean particle size of said crosslinked aqueous emulsion polymer is less than about 400 nm.

28. The composition of claim 27 wherein said polyhydrazide is selected from dihydrazides, trihydrazides, tetrahydrazides, bis-semicarbizides, aromatic polycarboxylic polyhydrazides, or mixtures thereof.

29. The composition of claim 28 wherein said polyhydrazide is selected from dihydrazides represented by the formula

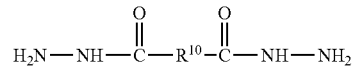

wherein $R^{10}$ is selected from a linear or branched divalent alkylene group having 0 to about 10 carbon atoms, preferably 2 to 10 carbon atoms, a divalent alicyclic group having 4 to about 8 carbon atoms, a divalent aromatic ring, or

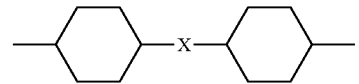

wherein the rings are alicyclic or aromatic and X is selected from —O—, —S—, —SO$^2$—, or —C(O)—; bis-semicarbizides represented by the formula

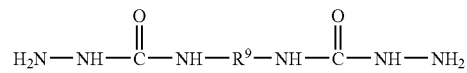

wherein $R^9$ is a divalent straight-chain or branched alkylene group having 2 to about 7 carbon atoms or a divalent carbocyclic group having 6 to 8 carbon atoms; trihydrazides represented by the formula

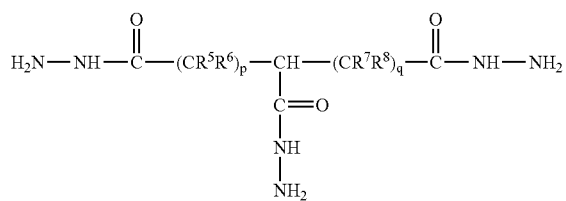

wherein $R^5$–$R^8$ are independently selected from H or OH, p is an integer from 0 to 3, and q is an integer from 2 to 8, provided p+q≦8 and p<q; or mixtures thereof.

30. The composition of claim 29 wherein said polyhydrazide is selected from oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, carbonic acid dihydrazide, phthalic acid dihydrazide, terephthalic acid dihydrazide, isophthalic acid dihydrazide, 1,2,4-butanetricarbohydrazide, 1,1,4-butanetricarbohydrazide, 1,2,5-pentanetricarbohydrazide, 1,3,6-hexane-tricarbohydrazide, 1,3,7-heptanetricarbohydrazide, 1-hydroxy-1,2,4-butanetricarbohydrazide, or mixtures thereof.

31. The composition of claim 28 wherein said polyhydrazide is an aliphatic dicarboxylic acid dihydrazide.

32. The composition of claim 31 wherein said polyhydrazide is adipic acid dihydrazide.

* * * * *